C. CHAMBERS, Jr.
REGULATING DEVICE.
APPLICATION FILED AUG. 3, 1909.
1,033,672.
Patented July 23, 1912.
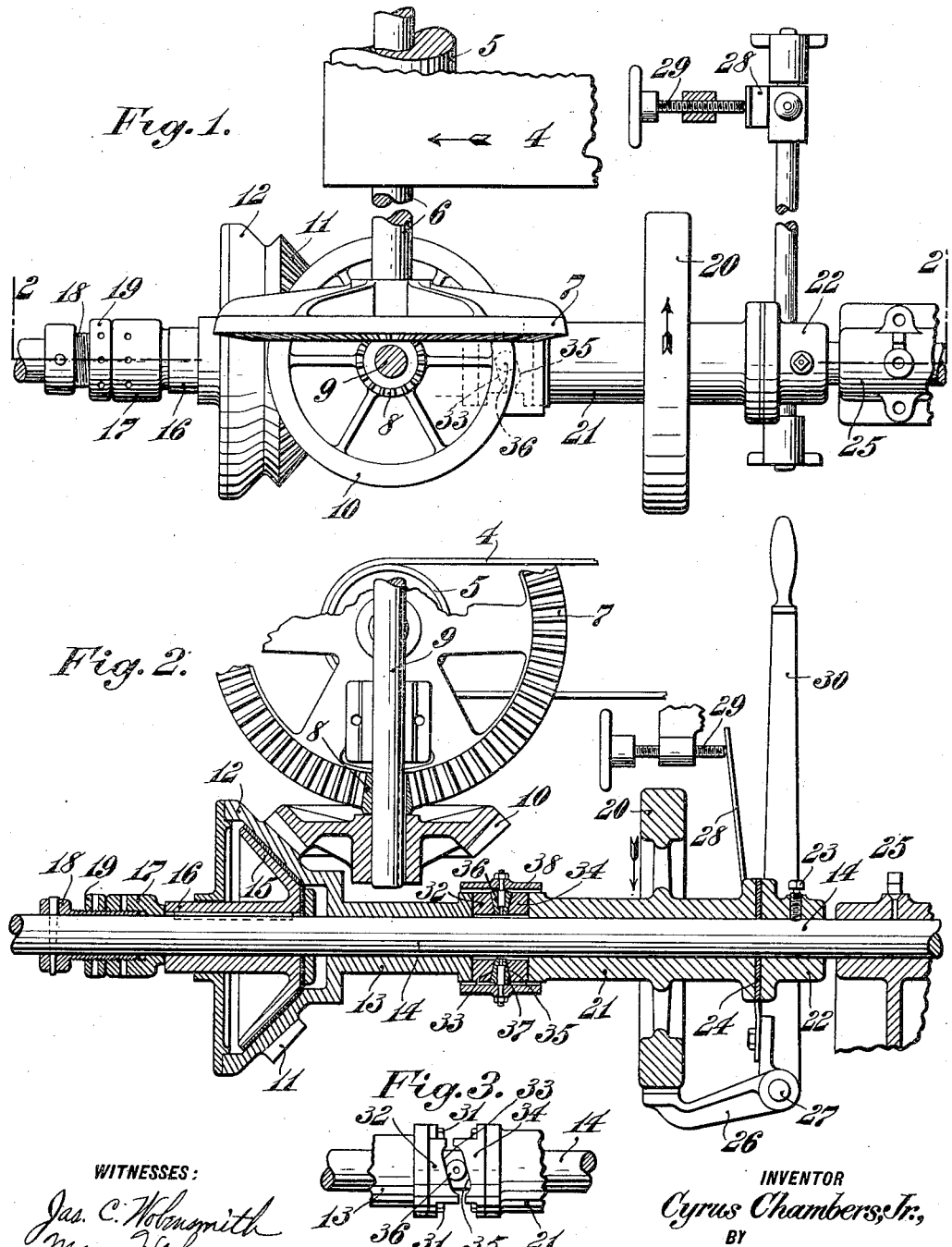

UNITED STATES PATENT OFFICE.

CYRUS CHAMBERS, JR., OF OVERBROOK, PENNSYLVANIA, ASSIGNOR TO CHAMBERS BROTHERS COMPANY, A CORPORATION OF PENNSYLVANIA.

REGULATING DEVICE.

1,033,672.      Specification of Letters Patent.      Patented July 23, 1912.

Application filed August 3, 1909. Serial No. 510,956.

*To all whom it may concern:*

Be it known that I, CYRUS CHAMBERS, Jr., a citizen of the United States, residing at Overbrook, in the county of Montgomery and State of Pennsylvania, have invented a new and useful Regulating Device, of which the following is a specification.

My invention relates to an automatic control or regulating device.

My object is to utilize, for the purpose of controlling certain mechanisms, translative end motion due to variation in speed of rotation of two rotating elements, operating an incline.

My invention is especially adapted to automatically regulate the efficiency of a friction clutch for driving the cut-off mechanism of a brick machine, so that the said cut-off shall operate relatively to the travel of the clay bar, and respond to variations in the speed of said travel.

Referring to the drawings:—Figure 1 is a plan view of my device. Fig. 2 is a vertical section on line 2—2 of Fig. 1. Fig. 3 is a detail in plan view of the parts showing the inclined faces.

Similar numerals refer to similar parts throughout the several views.

The regulating belt of the ordinary brick machine, such as is shown in patent to me No. 362,204, May 3, 1887, is indicated by 4. The regulating wheel 5 is mounted on shaft 6 provided with the beveled gear wheel 7, which meshes with the beveled gear or pinion 8 on shaft 9. Shaft 9 is provided with a beveled gear 10 which meshes with the gearing 11 on the friction element 12. Friction element 12 is provided with hub 13 which is loosely mounted on the line shaft 14. The other element 15 of the friction clutch is provided with a hub 16 feathered on shaft 14. The thrust collar or ring 17 is adapted to bear against the end of hub 16, and is threaded on the sleeve 18 which is pinned to the shaft 14 as clearly indicated in Fig. 2. The lock nut 19 also threaded on sleeve 18 secures the position of adjustment of the thrust collar 17. On shaft 14 is also loosely mounted the wheel 20, having the elongated hub 21. A collar 22 is fastened to and rotates with shaft 14. This collar may be secured in place by one or more set-screws 23. This collar 22 has an enlarged face adapted to coöperate with an enlarged face of hub 21 and a suitable friction surface 24 is interposed between hub 21 and collar 22 and secured either to the hub 21 or collar 22. The bearing or journal box 25 is provided for shaft 14. Other such bearings are suitably placed but not shown. A brake member 26, for engaging the periphery of wheel 20, is suitably mounted at 27, and is normally controlled by spring 28, the desired tension of which is secured by the set-screw 29. The handle 30 is provided for arbitrary operation of the brake. To hub member 13 is secured by bolts 31, or other suitable means, the member 32 having two segmental inclined faces 33, opposite to each other, and in the same direction of revolution. To hub 21 is similarly secured the member 34, provided with similarly coöperating inclined faces 35. Between these faces 33 and 35 are interposed the two rollers 36 and 37 secured to the ring or sleeve 38.

The operation of my device is as follows: It will be noted that the collars 17 and 22 are fixed on the shaft 14 and take the end thrust of hub 16 of friction element 15, and of hub 21, of fly wheel 20 respectively. It will also be seen therefore that the efficiency of engagement between the friction elements depends upon the relative positions of the inclined faces of members 32 and 34. That is to say, if these members 32 and 34 have a relative movement in one direction the friction member 12 is crowded more effectively against the friction member 15, while if there is relative movement in the other direction, member 12 is permitted to move slightly in the opposite direction to permit a less efficient friction engagement between the friction elements.

The normal efficiency of engagement between the friction elements suited for driving the cutting mechanism is secured by the engagement of brake 26 with wheel 20; the desired adjustment being secured by the set-screw 29. It will be understood that this adjustment is made in starting the machine, so that just enough power will be communicated through the friction clutch to drive the cut-off at a speed to correspond with the speed of travel of the clay bar. As long as the clay bar travels uniformly this adjustment will be maintained and the various parts, including wheel 20 will have a corresponding relative speed of rotation. As is well known however, there are fluctuations in the speed of travel of the clay bar, due to variations in the temper of the clay, etc. When, therefore the speed of travel of the clay bar becomes accelerated, and the travel of the measuring belt 4 and measuring pulley 5 are correspondingly accelerated, this acceleration of movement is communicated through the gears as above described, to the friction element 12, tending to accelerate its speed of travel beyond that of the wheel 20. This results in such relative movement between the members 32 and 34 as to cause a more efficient engagement between friction elements 12 and 15, so that the cut-off receives more power from the clutch and is speeded up to correspond to the accelerated speed of the clay bar. When, on the other hand, the movement or speed of travel of the clay bar is retarded below the normal speed, this retardation is correspondingly communicated through the gears to the clutch 12. The retarding of the speed of rotation of friction element 12, relative to the normal speed of rotation of wheel 20, which is maintained in part by its frictional relation with shaft 14, through collar 22, results in such relative movement between members 32 and 34, as to permit a separating movement of element 12 from element 15, and a decreasing efficiency of engagement between said friction elements. This results in a slowing up of the cut-off mechanism to correspond with the diminished speed of travel of the clay bar.

I do not wish to confine myself to the specific form of governor or wheel 20 shown, as I believe other forms of rotating element, bearing or coöperating with an inclined face, and having a frictional relation with the main driving shaft, and also a frictional brake applied thereto, would serve, under certain circumstances, or for certain kinds of cut-off.

What I claim is:—

1. A regulating device comprising two positively driven friction elements and two loosely mounted friction elements between and coöperating with the positively driven elements, said loosely mounted elements having coöperating parallel inclined faces.

2. A regulating device comprising two positively driven friction elements and two loosely mounted friction elements between and coöperating with the positively driven elements, said loosely mounted elements having coöperating inclined faces, and a brake operating on one of the loosely mounted elements.

3. A regulating device comprising two positively driven friction elements and two loosely mounted friction elements between and coöperating with the positively driven elements, said loosely mounted elements having coöperating inclined faces, and a spring controlled brake operating on one of the loosely mounted elements.

4. The combination of a line shaft, a friction clutch, a drive shaft connected with one clutch element, the other clutch element loosely mounted on the shaft, a rotative element also loosely mounted on the shaft and a brake adapted to operate thereon, thrust collars for securing the normal relation between the several rotative elements, and an incline operating between two rotative elements.

5. The combination of a line shaft, a friction clutch, a drive shaft connected with one clutch element, the other clutch element loosely mounted on the shaft, a rotative element also loosely mounted on the shaft and having frictional relation therewith, a brake adapted to operate thereon on the rotative element, thrust collars for securing the normal relation between the several rotative elements, and an incline operating between two rotative elements.

6. The combination of a line shaft, a friction clutch, a drive shaft connected with one clutch element, the other clutch element loosely mounted on the shaft, a rotative element also loosely mounted on the shaft and a brake adapted to operate thereon, thrust collars, one being adjustable, for securing the normal relation between the several rotive elements, and an incline operating between two rotative elements.

7. The combination of a line shaft, a friction clutch, a drive shaft connected with one clutch element, the other clutch element loosely mounted on the shaft, a rotative element also loosely mounted on the shaft, and a spring controlled brake adapted to operate thereon, thrust collars for securing the normal relation between the several rotative elements and an incline operating between two rotative elements.

8. The combination of a line shaft, a friction clutch, a drive shaft connected with one clutch element, the other clutch element loosely mounted on the shaft, a rotative element also loosely mounted on the shaft and a spring controlled brake adapted to operate thereon, means for adjusting the spring tension, thrust collars for securing the normal relation between the several rotative elements, and an incline operating between two rotative elements.

9. The combination of a line shaft, a friction clutch, a drive shaft connected with one clutch element, the other clutch element loosely mounted on the shaft, a fly wheel having frictional relation with the shaft, an incline between fly wheel and clutch element, a brake for operating on the periphery of said wheel, a spring for controlling the brake, and means for adjusting the tension of the spring.

10. The combination of a line shaft, a friction clutch, a drive shaft connected with one clutch element, the other clutch element loosely mounted on the shaft, a fly wheel having frictional relation with the shaft, an incline between fly wheel and clutch element, a brake for operating on the periphery of said wheel, a spring for controlling the brake, means for adjusting the tension of the spring, and a chain of gears connecting the line shaft with the drive shaft.

11. The combination of a line shaft, a friction clutch, a drive shaft connected with one clutch element, the other clutch element loosely mounted on the shaft, a fly wheel having frictional relation with the shaft, an incline between fly wheel and clutch element, a brake for operating on the fly wheel periphery, a spring for controlling the brake, means for adjusting the tension of the spring, and a chain of gears connecting the line shaft, the drive shaft and the friction clutch.

12. The combination of a line shaft, a friction clutch, a drive shaft connected with one clutch element, the other clutch element loosely mounted on the shaft, a rotative element also loosely mounted on the shaft and having frictional relation therewith, a brake adapted to operate thereon on the rotative element, thrust collars for securing the normal relation between the several rotative elements, two of said rotative elements provided with coöperating incline faces and anti-friction means operating therebetween.

CYRUS CHAMBERS, Jr.

Witnesses:
ALICE PUSEY CHAMBERS,
ELISABETH W. LEVERETT.

Copies of this patent may be obtained for five cents each, by addressing the "Commissioner of Patents, Washington, D. C."